(12) United States Patent
Billsus et al.

(10) Patent No.: US 7,757,170 B2
(45) Date of Patent: Jul. 13, 2010

(54) RECOMMENDATION AGGREGATION FOR DIGEST GENERATION

(75) Inventors: Daniel-Alexander Billsus, San Francisco, CA (US); Christopher D. Culy, Mountain View, CA (US); David M. Hilbert, Palo Alto, CA (US); Jonathan J. Trevor, Santa Clara, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 896 days.

(21) Appl. No.: 10/922,220

(22) Filed: Aug. 20, 2004

(65) Prior Publication Data

US 2006/0041843 A1    Feb. 23, 2006

(51) Int. Cl.
*G06F 3/00*    (2006.01)
(52) U.S. Cl. .................. 715/714; 715/745; 715/811; 715/708; 705/26; 705/27
(58) Field of Classification Search .......... 715/714, 715/745, 811, 708, 715, 738, 739, 764, 812, 715/813, 825, 846; 709/201–203; 705/10, 705/14, 26–27; 455/414.1–414.3; 725/9–22, 725/32–36
See application file for complete search history.

(56) References Cited

U.S. PATENT DOCUMENTS 6,131,110 A * 10/2000 Bates et al. ................. 709/203

2002/0010625 A1 * 1/2002 Smith et al. ................. 705/14
2004/0043758 A1 * 3/2004 Sorvari et al. ............ 455/414.1
2004/0153373 A1 * 8/2004 Song et al. ................. 705/26

OTHER PUBLICATIONS

J. Budzik et al., "Information Access in Context," *Knowledge-Based Systems*, 14 (1-2), pp. 37-53, 2001.
Konstan. "Introduction to Recommender Systems: Algorithms and Evaluation," ACM Transactions on Information Systems, vol. 22, No. 1, pp. 1-4, Jan. 2004.
Rhodes, "Just-In-Time Information Retrieval," Program in Media Arts and Sciences, 154 pages, May 2000.
Wolber et al., "Exposing Document Context in the Personal Web," Proceedings of the International Conference on Intelligent User Interfaces (IUI 2002), University of San Francisco.

* cited by examiner

*Primary Examiner*—Weilun Lo
*Assistant Examiner*—Rashedul Hassan
(74) *Attorney, Agent, or Firm*—Sughrue Mion, PLLC

(57) ABSTRACT

Systems and methods for processing automatically generated recommendations. In various exemplary embodiments, a method of producing a recommendation digest for a user includes (a) generating a recommendation log for the user by storing a plurality of recommendations, one or more of the plurality of recommendations relating to a representation of a context that led to the creation of the one or more recommendations for the user, and (b) determining a subset of recommendations by using one or more statistics obtained from processing the plurality of recommendations stored in the log.

41 Claims, 4 Drawing Sheets

RECOMMENDATION AGGREGATION FOR DIGEST GENERATION

BACKGROUND OF THE INVENTION

1. Field of Invention

This invention relates to systems and methods for processing automatically generated recommendations.

2. Description of Related Art

Computers are increasingly being used as tools for information access and communication. We routinely search the World Wide Web for information, locate corporate documents on local Intranets, use our computers to read daily news, send and receive email or shop for products. While the advent of such widespread connectivity has undoubtedly led to a significant productivity increase, it has also introduced new challenges. For example, "information overload" is no longer just a trendy buzzword, but a daily reality for most of us. As a result, approaches that address information overload continue to receive attention in the form of ongoing academic research and novel products.

Within this context, automatically generated recommendations play an important role. We continuously receive these recommendations while we are interacting with information services. For example, we receive product recommendations while we shop: Amazon.com and many other online retailers recommend products similar to the ones just bought or accessed. We receive contextual ads based on our search terms when we search the World Wide Web: displaying ads on search result pages is now a common practice followed by Google and virtually all other search engine providers. Displaying these ads or product suggestions can be interpreted as a "proactive contextual recommendation"—proactive, because the user does not have to explicitly request a recommendation, and contextual because the recommendation is related to the user's current context, e.g. a search on topic X, or the recent acquisition of product Y.

Clearly, proactive contextual recommendations are not limited to product recommendations or advertisements. Information overload and information discovery are issues that extend into the corporate workplace, and as a result, several commercial products as well as research projects have recently focused on proactive information access for corporate knowledge management. For example, products made by knowledge and content management infrastructure vendors such as Autonomy and Verity can proactively recommend documents, often based on implicit techniques designed to anticipate users' information needs. Research prototypes such as Watson, Remembrance Agent, and FAPAL Bar by Fuji Xerox Palo Alto Laboratory (FXPAL) are further examples of systems that provide proactive contextual access to corporate resources.

While the utility of proactive contextual recommendations has been demonstrated within various application scenarios, the approach suffers from two significant problems. First, proactive recommendations are typically communicated via subtle interfaces—the user is supposed to see them, but if they become too obtrusive or distracting, the overall user experience may suffer. Since proactive recommendation interfaces tend to be subtle (e.g. a small ad at the side of the screen, or an icon indicating the availability of related information), users frequently miss potentially useful information. Similarly, users may not wish to interrupt their current task, even if they notice that they just received a recommendation.

Second, contextual recommendations are frequently irrelevant or inaccurate. Since these recommendations are commonly based on limited information, e.g. the user's last search or purchase, and do not require users to explicitly express their information needs, there is a high chance that the recommendation may not be relevant to the user's needs.

Another drawback associated with the current approaches is the lack of persistence. There is typically no obvious way to return to previously recommended items. Users may remember that they previously saw a recommendation that looked promising, but unless they know exactly how recommendations were triggered, they cannot easily return to them.

SUMMARY OF THE INVENTION

This invention provides methods and systems that aggregate individual recommendations to find a subset of recommendations that is particularly relevant to the user.

This invention also provides methods and systems that allow individual contextual recommendations to be included into a recommendation digest. The digest may allow users to access recommendations they may have previously missed, and improve recommendation accuracy.

In various exemplary embodiments, the systems and methods according to this invention include (a) generating a recommendation log for the user by storing a plurality of recommendations, one or more of the plurality of recommendations relating to a representation of a context that led to the creation of the one or more recommendations for the user, and (b) determining a subset of recommendations by using one or more statistics obtained from processing the plurality of recommendations stored in the log.

BRIEF DESCRIPTION OF THE DRAWINGS

Various exemplary embodiments of the systems and methods of this invention will be described in detail below, with reference to the following figures, in which.

DETAILED DESCRIPTION OF PREFERRED EMBODIMENTS

Figure 1:
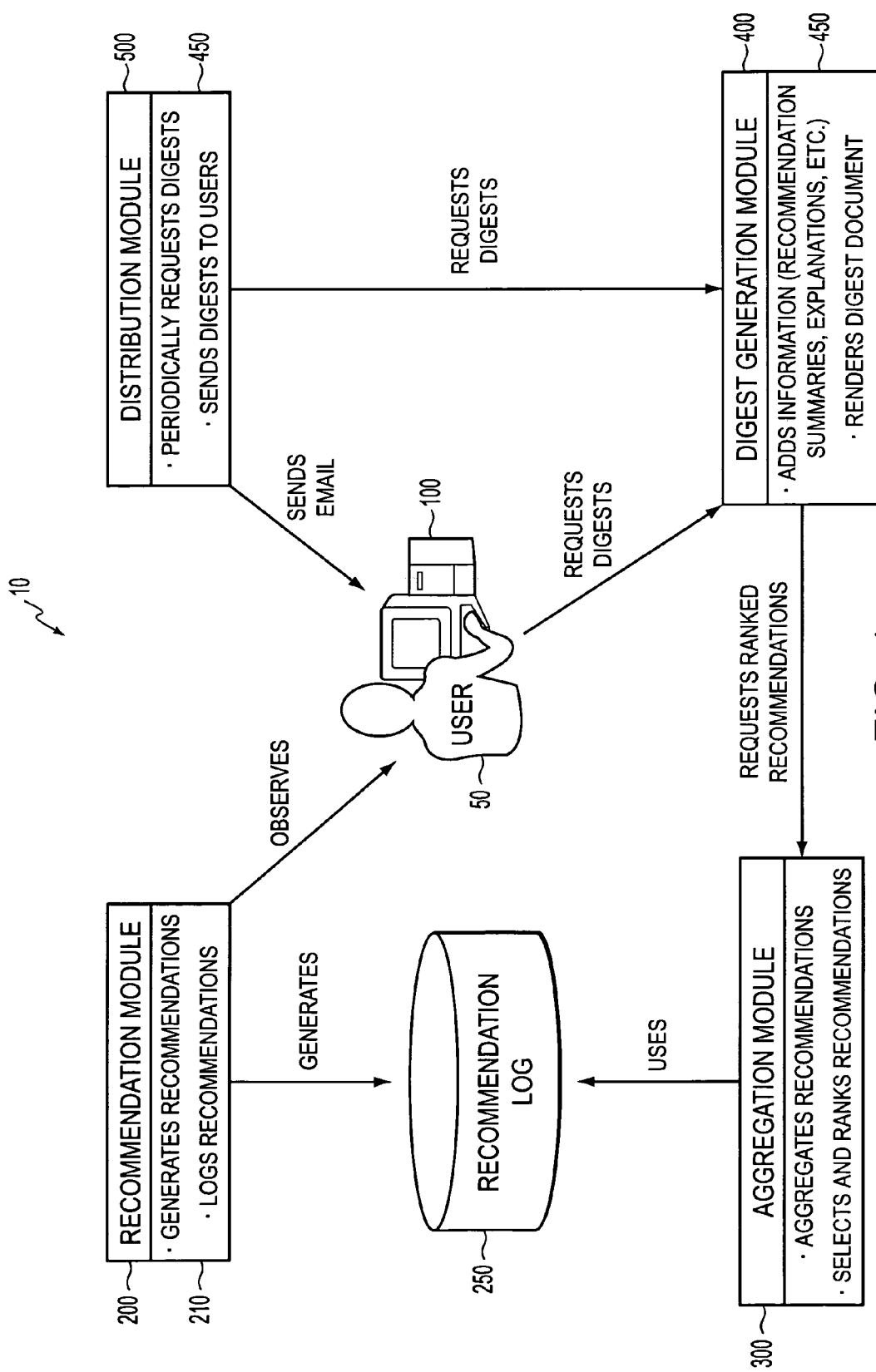
FIG. 1 is a high-level schematic representation of one exemplary embodiment of a method and system for generating a recommendation digest.

FIG. 1 is a high-level schematic representation of one exemplary embodiment of the implementation of a method and system for generating a recommendation digest according to this invention.

According to various exemplary embodiments, the systems and methods of this invention employ a straightforward approach to address the above described problems and limitations: recommendation aggregation. Aggregating individual contextual recommendations into a recommendation digest allows users to access recommendations they may have previously missed, and may improve recommendation accuracy.

The systems and methods of this invention are generally applicable to a broad range of usage scenarios. Briefly stated, whenever an item I is recommended to user U, the pair I-U is logged, possibly along with additional information such as the date and time of the recommendation, the context that triggered the recommendation (e.g. a URL) and a measure of the system's confidence in the recommendation. This leads to a recommendation log that can be easily and efficiently turned into a recommendation digest by aggregating individual recommendations.

The underlying intuition is that items that were recommended multiple times to the same user over a specified period of time (potentially based on multiple different contexts) are more likely to be actually related to the user's information needs or interests. The highest ranking aggregated recommendations can be included in a recommendation digest, which, depending on the application scenario, can either be made available periodically (e.g. emailing a weekly digest of the most relevant corporate resources) or requested on demand (e.g. requesting a digest of books recommended during the last 2 months). Users may optionally customize theses digests, e.g. by restricting the recommended items to specific types (e.g. internal memos vs. publications), specifying preferred topics (e.g. recommendations related to Java), or specifying preferred date/time ranges.

The proposed approach assumes that an information system (typically server-based) provides users with contextual recommendations. This information system can be a corporate knowledge management system, a search engine, the web site of an online retailer or any other system that provides information and related recommendations to users. It is important to note that users can, but do not have to explicitly interact with this system. For example, users typically interact explicitly with search engines or eCommerce applications. However, the invention equally applies to systems that passively observe the user's interactions with other applications, and proactively provide recommendations if or when information related to the user's context becomes available.

Based on information and associated recommendations provided by the information system, the proposed approach generates a recommendation digest—a document that contains a subset of previous recommendations. The approach attempts to include only those recommendations thought to be particularly useful to the user. The generated digest may optionally include further information about the recommendations, such as brief descriptions of the recommended resource or brief explanations that clarify why a resource was recommended to the user.

In various exemplary embodiments, the recommendation digest generation system/process 10 may include four conceptual modules or components. FIG. 1 schematically illustrates the information flow between these modules.

The recommendation logging module or component 200 observes the user's 50 interactions with the information system 100, analyzes the user's context (e.g. the currently displayed text) and generates contextual recommendations 210. The module 200 also logs all recommendations 210 in a recommendation log 250, for example, item I was recommended to user U based on URL R.

The aggregation module 300 uses the recommendation log 250 to determine n recommendations to be included in the digest. The main underlying idea is that resources that were repeatedly recommended to the same user are likely to be relevant to the user's information needs or interests. The aggregation module 300 takes into account all instances in which item I was recommended to user U during a specified period of time. As part of this process, the module 300 computes several statistics, based on the individual recommendations, which all serve as predictors of the user's interest in item I. For example, these statistics may include the total number of times item I was recommended to user U, the number of different contexts that triggered the recommendation, as well as the recommendation's distribution over time. Using these aggregated statistics 310, every item recommended to user U may receive an overall score indicating the predicted relevance of the recommendation. The module 300 uses this score to rank recommendations 320, in order to identify the recommendations to include in the digest.

The digest generation module 400 uses the recommendations identified by the aggregation module 300 to render a digest document 450. In addition to the recommendations, this module can add additional information. For example, if the recommendation refers to a document, a brief summary of the document makes the recommendation more valuable to users. Likewise, this module 400 can add simple explanations that indicate why certain resources where recommended. For example, the products, search terms or visited web pages that led to the original recommendations can be made available to the user. Users 50 may explicitly request a recommendation digest from this module, for example, a knowledge management system could provide a function that, upon request, displays the most relevant documents recommended during the last week.

The distribution module 500 is an optional component that periodically requests digests 450 for users who would like to receive digests via a subscription model, e.g. by email. This module 500 may maintain distribution preferences for individual users (e.g. daily, weekly or monthly digests) to generate and distribute digests according to this schedule.

In the following sections, various exemplary embodiments of the systems and methods according to this invention are described in more detail. First, an exemplary implementation of the proposed approach within the context of a corporate knowledge discovery system developed at Fuji Xerox Palo Alto Laboratory (FXPAL) is described. Next, an exemplary digest document is presented. Finally, to illustrate the generality of the approach, brief outlines of exemplary embodiments are presented, including additional applications, search and online retail sites.

FXPAL Bar Content Digest

Figure 2:
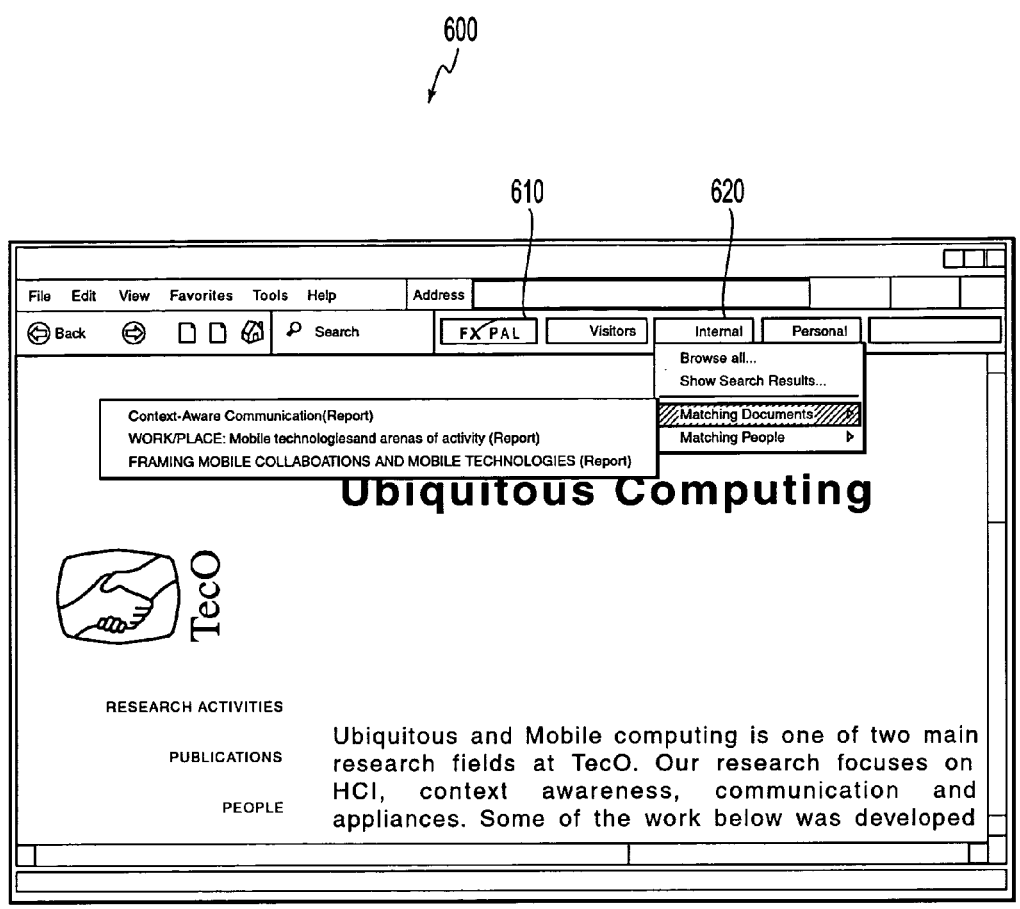
FIG. 2 illustrates an existing FXPAL corporate knowledge discovery system based on proactive contextual recommendation.

The FXPAL Bar is a corporate knowledge discovery system, based around the idea of proactive contextual recommendations. The FXPAL Bar 600 is implemented as a toolbar 610 that runs within common desktop applications such as MS Internet Explorer and Outlook. It uses a web-service-based Information Retrieval framework to analyze the user's current context, e.g. the currently displayed web page or email message, and provides proactive access to closely related contacts and documents. FIG. 2 shows the FXPAL Bar 600 embedded within Microsoft's Internet Explorer. In this example, the user just opened a web page on Ubiquitous and Mobile Computing. As a result, the FXPAL Bar 600 proactively recommends several corporate documents closely related to the currently displayed text. The bar indicates the availability of related content by changing the color of a resource category to red. In this case, the "Internal" button 620 just turned red, indicating that internal documents related to the displayed page are available. When the user clicks the "Internal" button 620, a drop-down menu appears, allowing users to access the recommended documents. Note that, in its current instantiation, the FXPAL Bar 600 communicates the availability of related content via a color change, which is a very subtle interface cue. It is important for the interface to be subtle, so that it does not interfere with the user's current task. However, the downside of this unobtrusive approach is that users often miss potentially useful information.

In various exemplary embodiments according to the systems and methods of this invention, a proposed recommendation digest would generally overcome this problem, as discussed below. Assume that, in addition to the page shown in FIG. 2, a user accesses additional pages related to ubiquitous and mobile computing. In this case, the FXPAL Bar 600 is likely to recommend the same documents to the same user multiple times, and the server logs all of these recommendation instances in its recommendation log. When the server generates a recommendation digest for this user, aggregating the individual results over a specified period of time will reveal that a small set of resources were recommended to the same user based on multiple different URLs. This pattern is a reasonable indicator of the user's interest in the ubiquitous and mobile computing topic, and the server includes these documents in the next digest that will be emailed to the user.

Figure 3:
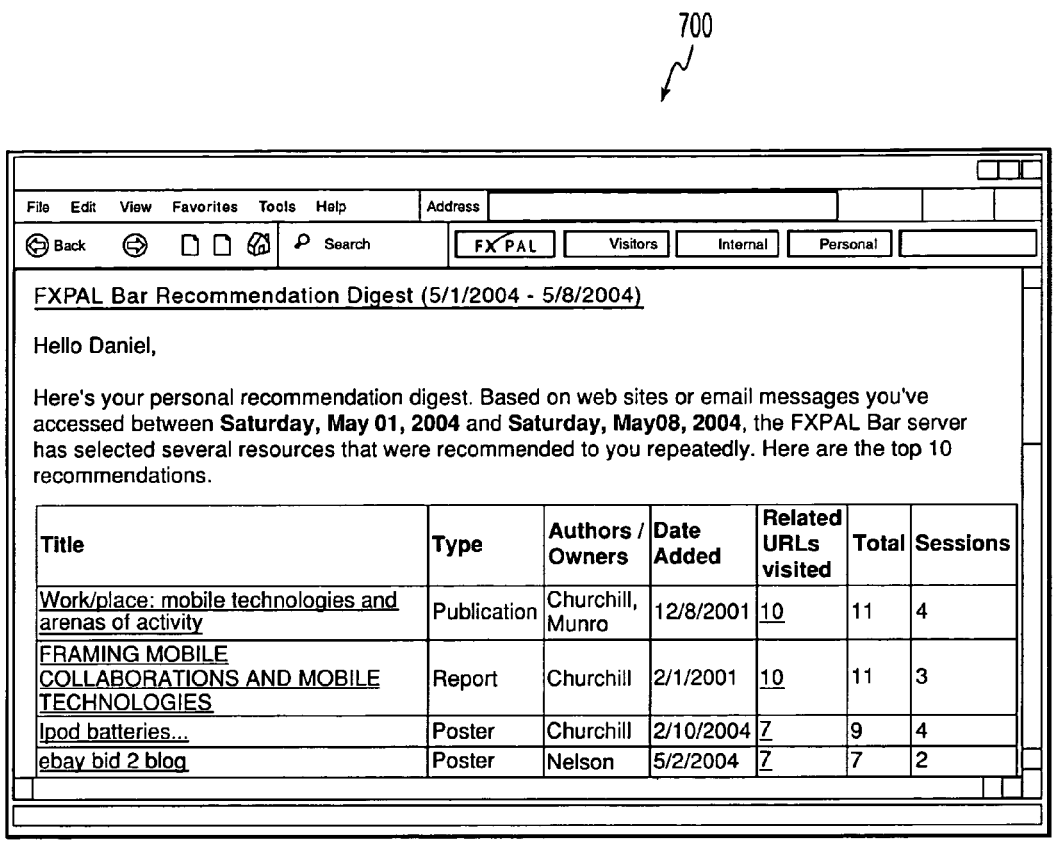
FIG. 3 shows an exemplary embodiment of a recommendation digest generated based on the FXPAL usage scenario.

FIG. 3 shows an exemplary recommendation digest 700 generated based on the described usage scenario. In this example, the following information is listed for each aggregated recommendation:

Title. Title of the document. The user can click on the title to open the recommended document.

Type. Type of the document, e.g. to distinguish between different categories of corporate documents, such as reports, memos or publications.

Date. The date of the recommended document.

Related URLs visited. This is the number of distinct URLs that triggered a recommendation for the document. It serves as a simple recommendation explanation—when the user clicks on this number, a list of visited web pages that triggered the recommendation is displayed.

Total Recommendations. The total number of times the document was recommended. This number is always equal or greater than the number of related URLs, and quantifies how often the user returned to previously accessed related information.

Sessions. The number of distinct usage sessions during which the document was recommended. This number is an indicator of long-term or recurring information needs.

The recommendation digest 700 shown in FIG. 3 focuses on the user's most significant browsing patterns (with respect to recommendations) during a specified period of time (one week in this example) and brings relevant corporate resources to the user's attention. In the example shown, the digest is rendered as a web page that the user may have explicitly requested. Clearly, the same digest could have been automatically emailed to the user in the form of an HTML email message.

Ad Digest

Search engines, e.g. Google, frequently display ads for vendors, products or services related to the user's query terms. Likewise, there are many other sites, e.g. news sites, that are ad supported and make use of ad servers—software that selects ads related to the currently displayed information. In this scenario, ads can be seen as another form of contextual proactive recommendation. Similar to the content discovery scenario described above, users frequently miss ads that are potentially useful. Using similar aggregation techniques as described above, it is likely that the click-through rates of ads could be increased, if users were able to access the most relevant ads they saw during a specified period of time.

While an email-based subscription model would likely be perceived as spam, an on-demand function that allows users to see their top-ranked ads of the day, week or month may actually be of value to many users. For example, including an extra link on the home page of a search engine saying "My Weekly Ad Digest" may be useful to some users, without being too distracting for users who do not want to see these ads. Alternatively, serving top-ranked ads on content or search result pages (i.e. ads that were frequently recommended during previous interactions, but are not necessarily related to the current page) is another possible delivery method.

Online Retailer Product Digest

Many online retailers use information about users' past purchases to recommend additional products or services. For example, Amazon.com displays product recommendations on every product page the user accesses. In addition, Amazon allows users to view a set of recommendations at any time: a link on their home page saying "we have recommendations for you", as well as a function called "The page you made" provide on-demand access to recommendations.

However, it will be noted that the recommendations in this latter set are not determined via recommendation aggregation. Clicking on Amazon's "Why was this recommended" links reveals that recommendations are based on purchased products, or even accessed products, but are not based on the frequency of recommendations during specific periods of time. For example, if a user repeatedly returns to the product page of a certain CD to listen to sound clips, the user will likely receive repeated recommendations for a second related CD. According to the proposed aggregation approach, the fact that the second CD was recommended repeatedly within a specific time-frame could be logged and factored into the recommendation process.

The systems and methods according to this invention provide a number of significant advantages over the existing systems, such as:

Recommendation aggregation—no other system aggregates the recommendations received by a single user over a specific period of time as a way to identify particularly useful recommendations;

Digest generation based on recommendation aggregation—no other system uses recommendation aggregation, i.e. indicators such as the number of times recommendations where shown during a specific time frame, to generate recommendation digests; and Novel applications of recommendation digests—there is no corporate knowledge discovery system that generates recommendation digests based on previously shown recommendations. Likewise, there is no search engine or ad server that allows users to access digests of aggregated contextual ads.

In various exemplary embodiments, the implementation of the proposed recommendation aggregation is straightforward. In this section, several variables that can be logged and incorporated into the aggregation procedure are discussed. Also described is an exemplary implementation to illustrate the simplicity of the approach.

It is important to note that that the proposed approach is independent of the underlying recommendation algorithm that generates contextual recommendations. This recommendation algorithm could be based on textual similarity (as is the case for FXPAL's FXPAL Bar), collaborative filtering or any other predictive or associative method described in the literature. Therefore, the approach applies to all systems that generate recommendations based on a user's interaction with an information system or the observed interaction with an application such as a web browser or email client.

Figure 4:
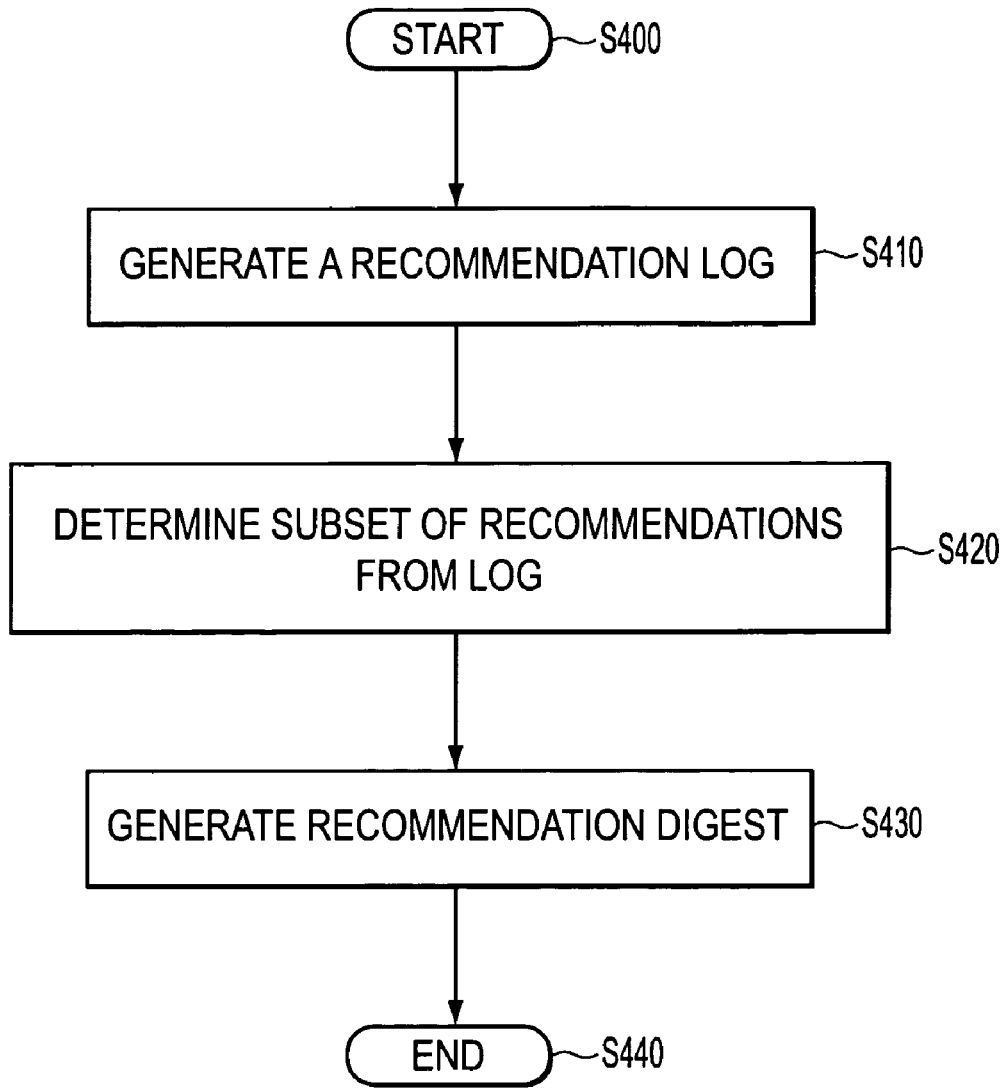
FIG. 4 is a flowchart outlining one exemplary embodiment of a method for generating a recommendation digest according to this invention.

FIG. 4 is a flowchart outlining one exemplary embodiment of a method for generating a recommendation digest according to this invention. As shown in FIG. 4, the method begins in step S400, and continues to step S410, where a recommendation log is generated. In various exemplary embodiments, a recommendation log suitable for subsequent recommendation aggregation may include the following variables:

Resource ID. Identifies the recommended resource, such as a document, advertisement or product.

Date/Time. The date and time of the recommendation, so that recommendations can be aggregated over a specified period of time.

Session Number. Many server-based information systems use the concept of a session: a session typically lasts several minutes and remains active while the user is actively using the information system. A period of inactivity causes a session to time out. In the context of this invention, the number of distinct sessions during which an item was recommended to a user can be interpreted as a measure of long-term interests.

Score. Most recommendation approaches support a numeric assessment of the strength or confidence of recommendations. For example, for a recommendation system based on textual similarity, this score could be a similarity score.

Rank. Most recommendation approaches can determine multiple recommendations ordered by their respective recommendation scores (e.g. multiple documents or multiple products). The rank is the position of the recommended item in a sorted list of recommendations. For example, the rank provides a simple mechanism to restrict recommendations to consider for aggregation, without defining arbitrary score thresholds.

Context. The action or state that triggered the recommendation. The context differs from application to application, but could include accessed URLs, entered search terms or purchased products.

The list provided above is clearly not exhaustive and additional information further describing individual recommendations may be logged as well. For example, it is possible to persist information about recommendations already included in previous digests, so that the aggregation algorithm can avoid generating the same or a very similar digest multiple times. In addition, users may not want to receive recommendations about items they are aware of, such as ads they have already clicked on or documents they have opened before, and to prevent this, access information could be persisted as part of the recommendation log.

Next, in step S420, a subset of recommendations are determined from the log. In various exemplary embodiments, a recommendation aggregation process is performed, as described below.

The main goal of the aggregation process is to identify recommendations that were repeatedly recommended to the same user during a specified period of time. The result of this process could be a set of numeric values that quantify the perceived relevance of the recommendation. For example, the recommendation digest shown in FIG. 3 displays the following values:

Number of distinct contexts. In the example shown in FIG. 3 this is the number of distinct URLs. In other application scenarios, this value could be the number of distinct queries or the number of distinct products purchased or viewed. This is likely to be a strong relevance indicator, as every recommendation of the same item based on a different context can be interpreted as an additional piece of evidence of the recommendation's relevance.

Total number of recommendations. The total number of times the item was recommended.

Number of distinct sessions. The number of distinct usage sessions during which an item was recommended. As discussed above, this number is a predictor of long-term information needs or interests.

In addition to the three statistics listed above, the aggregation process can be based on the score or rank of individual recommendations. This could be accomplished by aggregating scores (e.g. using the average score), restricting recommendations to be included to certain ranks or scores, or using any other sensible method that takes these values into account.

An additional benefit of the proposed approach is that logged recommendations can be aggregated very efficiently. Therefore, the approach should be easily scalable to real-word requirements, such as information systems with millions of users. For example, an obvious implementation choice is to persist recommendations in a relational database. In this case, a simple aggregation algorithm can be expressed efficiently in the form of a simple SQL query. Table 1 shows the SQL Select statement that generated the digest shown in FIG. 3.

TABLE 1

Recommendation Aggregation as an SQL SELECT statement

SELECT documentID, title, rt.name, dateEntered,
        COUNT(*) AS recFrequency, COUNT(DISTINCT
        urlID) AS
distinctURLs,
        COUNT(DISTINCT sessionNumber) AS distinctSessions
FROM    DocumentRecommendations AS
        dr JOIN ResourceTypes AS rt ON dr.type = rt.type
        WHERE userHash IN (SELECT DISTINCT(userHash) from
        UserGroups
        WHERE groupName = @groupName AND (score >=
        @minScore) AND
        (tStamp >= @startDate) AND (tStamp < @endDate)
GROUP BY documentID, title, rt.name, dateEntered
HAVING  (COUNT(DISTINCT urlID) >= @minDistinctURLs) AND
        (COUNT(DISTINCT sessionNumber) >=
        @minDistinctSessions)
ORDER BY distinctURLs DESC, distinctSessions DESC, recFrequency
DESC;

In step S430, a digest that includes summaries, is generated. Operation then continues to step S440, where operation of the method stops.

The digest generation step S430 converts a set of aggregated recommendations into a document, e.g. a web page or an email message, to be accessed by end users. Generating an HTML document is an obvious choice, because the same, or at least very similar document, can be used as a web page and an email message. An additional advantage of HTML is that additional information about the recommendations can be made available via hyperlinks. For example, the digest shown in FIG. 3 includes links to the recommended documents, as well as pages that serve as explanations for recommendations. Thus, clicking on the number of distinct URLs takes the user to a page that lists all visited URLs that triggered the recommendation.

One of the embodiments of the present invention includes a machine-readable medium that provides instructions for processing information. The instructions provided to this machine-readable medium, when executed by a processor, cause the processor to perform certain operations. These operations may include generating a recommendation log for a user by storing a number of recommendations, ranking the recommendations according to one or more statistics obtained from processing the recommendations, and determining a subset of the recommendations from the ranked recommendations to obtain a recommendation digest. The recommendations relate to a representation of a context that leads to the creation recommendations for the user. The machine-readable medium may be any appropriate tangible physical article or object. It is usually a medium capable of storing data in a form that can be accessed by an automated sensing device. Examples of machine-readable media include (a) magnetic disks, cards, tapes, and drums, (b) punched cards and paper tapes, (c) optical disks, and physical media encoded with (d) barcodes and (e) magnetic ink characters.

Another embodiment of the invention includes a system that is capable of generating a recommendation digest for a user. The system may include a storage medium and one or more processing units. The storage medium may serve as a logging component that accepts recommendations in response to the user accessing content and stores the recommendations in a recommendation log. One processing unit may serve as an aggregation component that ranks the recommendations in the recommendation log according to one or more statistics and determines a subset of recommendations by using the rank of each of the recommendations. Another processing unit may serve as a digest generation component that generates the recommendation digest based on the subset of recommendations determined by the aggregation component. The processing units and storage media that are used in the system of this embodiment of the invention may be represented by the recommendation module 200, recommendation log 250, aggregation module 300 and digest generation module 400 of FIG. 1.

This invention has been described in conjunction with the exemplary embodiments outlined above. Various alternatives, modifications, variations, and/or improvements are within the spirit and scope of the invention, whether known or presently unforeseen. Accordingly, the exemplary embodiments of the invention, as set forth above, are intended to be illustrative, not limiting. Various changes may be made without departing from the spirit and scope of the invention. Therefore, the invention is intended to embrace all known or later developed alternatives, modifications, variations and/or improvements.

What is claimed is:

1. A method of producing a recommendation digest for a user in an information system, the method comprising:
   generating a plurality of recommendations related to interaction of the user with the information system, wherein each of the plurality of recommendations is based on an informational context of a network resource containing information, the network resource being of a plurality of network resources accessed by the user;
   providing the generated plurality of recommendations to the user;
   generating a recommendation log for the user by storing the plurality of recommendations provided to the user;
   obtaining a frequency of occurrence of each of the recommendations by processing the plurality of recommendations stored in the recommendation log; and
   determining a subset of recommendations based on the frequency of occurrence of each of the recommendations provided to the user,
   wherein the frequency of occurrence of each of the recommendations is a number of times a recommendation is provided to the user; and
   wherein the subset of recommendations is further based on a computed number of distinct usage sessions during which the item was recommended to the user and wherein the computed number of distinct usage sessions are computed by the system.

2. The method of claim 1, further comprising providing an indication to the user of the recommendation digest generated based on the subset of recommendations determined.

3. The method of claim 1, further comprising:
   computing a number of distinct contexts in which a recommendation for an item occurred,
   wherein the subset of recommendations is further based on the computed number of distinct contexts in which a recommendation for the item occurred.

4. The method of claim 1, wherein determining a subset of recommendations comprises processing the plurality of recommendations stored in the recommendation log according to at least one of: a date range, a time range, type of item for which the recommendation was created, and a specific topic relating to the one or more of the plurality of recommendations.

5. The method of claim 1, wherein determining a subset of recommendations comprises determining an overall score for the one or more recommendations included in at least a part of the plurality of the stored recommendations, the overall score being used as a relevance score that predicts the user's level of interest in the one or more recommendations.

6. The method of claim 1, wherein generating a recommendation log for the user and determining a subset of recommendations are performed passively without user interaction.

7. The method of claim 2, wherein providing an indication to the user of the recommendation digest generated is performed periodically or upon receipt of a user action.

8. The method of claim 2, wherein providing an indication to the user of the recommendation digest generated is performed automatically using one or more of at least electronic email, electronic messaging and wireless messaging.

9. The method of claim 1, wherein the recommendation digest generated comprises one or more of at least a listing of the recommendations in the digest, a title for the recommendation generated, an information summary for an item for which one or more recommendations were made, a basis for generating the recommendation for a particular item, an aggregate number of recommendations generated for the particular item, date when the recommendation was added to the recommendation log, and information regarding related uniform resource locators visited.

10. The method of claim 1, the one or more recommendations being determined by a recommender component in response to a user accessing content comprising one or more of at least web pages, email messages, documents and images, and wherein the determined recommendations are links to content of potential interest to the user.

11. The method of claim 1, the one or more recommendations being determined by a recommender component in response to a user accessing content comprising one or more of at least product descriptions, web pages, email messages, documents and images, and wherein the determined recommendations are identifiers of products of potential interest to the user.

12. The method of claim 1, the one or more recommendations being determined by a recommender component in response to a user accessing content comprising one or more of at least product descriptions, web pages, email messages, documents and images, and wherein the determined recommendations are advertisements.

13. The method of claim 1, wherein one or more recommendations are hyperlinks embedded in content accessed by the user.

14. A system to generate a recommendation digest for a user, comprising:
   an input interface for receiving user interaction with the system;
   a module for generating a plurality of recommendations related to the user interaction with the system, wherein each of the plurality of recommendations is based on an informational context of a network resource containing information, the network resource being of a plurality of network resources accessed by the user;

a display for providing the generated plurality of recommendations to the user;

a storage medium serving as a logging component that accepts the generated plurality of recommendations being stored in a recommendation log;

a first processing unit serving as an aggregation component that determines a subset of recommendations based on a frequency of occurrence of each of the recommendations, the frequency of occurrence of each of the recommendations being obtained from processing the plurality of recommendations stored in the recommendation log; and a second processing unit serving as a digest generation component that generates the recommendation digest based on the subset of recommendations determined by the aggregation component, wherein the frequency of occurrence of each of the recommendations is a number of times a recommendation is provided to the user; and wherein the subset of recommendations is further based on a computed number of distinct usage sessions during which the item was recommended to the user and wherein the computed number of distinct usage sessions are computed by the system.

15. The system of claim 14, wherein the digest generation component further provides an indication to the user of the recommendation digest generated.

16. The system of claim 14, wherein the subset of recommendations is further based on a computed number of distinct contexts in which a recommendation for the item occurred and wherein the computed number of distinct contexts are computed by the system.

17. The system of claim 14, the aggregation component determining a subset of recommendations by processing the plurality of recommendations stored in the recommendation log according to at least one of: a date range, a time range, type of item for which the recommendation was created, and a specific topic relating to the one or more of the plurality of recommendations.

18. The system of claim 14, the aggregation component determining a subset of recommendations comprises determining an overall score for the one or more recommendations included in at least a part of the plurality of the stored recommendations, the overall score being used as a relevance score that predicts the user's level of interest in the one or more recommendations.

19. The system of claim 14, wherein generating the recommendation log for the user and determining the subset of recommendations are performed passively without user interaction.

20. The system of claim 15, wherein providing an indication to the user of the recommendation digest generated is performed periodically or upon receipt of a user action.

21. The system of claim 15, wherein providing an indication to the user of the recommendation digest generated is performed automatically using one or more of at least electronic email, electronic messaging and wireless messaging.

22. The system of claim 14, wherein the recommendation digest generated comprises one or more of at least a listing of the recommendations in the digest, a title for the recommendation generated, an information summary for an item for which one or more recommendations were made, a basis for generating the recommendation for a particular item, an aggregate number of recommendations generated for the particular item, date when the recommendation was added to the recommendation log, and information regarding related uniform resource locators visited.

23. The system of claim 14, the one or more recommendations being determined by the recommender component in response to a user accessing content comprising one or more of at least web pages, email messages, documents and images, and wherein the determined recommendations are links to content of potential interest to the user.

24. The system of claim 14, the one or more recommendations being determined by the recommender component in response to a user accessing content comprising one or more of at least product descriptions, web pages, email messages, documents and images, and wherein the determined recommendations are identifiers of products of potential interest to the user.

25. The system of claim 14, the one or more recommendations being determined by the recommender component in response to a user accessing content comprising one or more of at least product descriptions, web pages, email messages, documents and images, and wherein the determined recommendations are advertisements.

26. The system of claim 14, wherein one or more recommendations are hyperlinks embedded in content accessed by the user.

27. A machine-readable medium that provides instructions for processing information in an information system, instructions that, when executed by a processor, cause the processor to perform operations comprising:

generating a plurality of recommendations related to interaction of a user with the information system, wherein each of the plurality of recommendations is based on an informational context of a network resource containing information, the network resource being of a plurality of network resources accessed by the user;

providing the generated plurality of recommendations to the user;

generating a recommendation log for the user by storing the plurality of recommendations provided to the user;

ranking the plurality of recommendations based on a frequency of occurrence of each of the recommendations provided to the user, the frequency of occurrence of each of the recommendations being obtained by processing the plurality of recommendations stored in the recommendation log to obtain ranked recommendations; and determining a subset of recommendations from the ranked recommendations to obtain a recommendation digest, wherein the frequency of occurrence of each of the recommendations is a number of times a recommendation is provided to the user; and wherein the subset of recommendations is further based on a computed number of distinct usage sessions during which the item was recommended to the user and wherein the computed number of distinct usage sessions are computed by the system.

28. The machine-readable medium of claim 27, wherein operations further comprise providing an indication to the user of the recommendation digest generated based on the subset of recommendations determined.

29. The machine-readable medium of claim 27, wherein the processor is further caused to compute a number of distinct contexts in which a recommendation for an item occurred and wherein the-subset of recommendations is further based on the computed number of distinct contexts in which a recommendation for the item occurred.

30. The machine-readable medium of claim 27, wherein determining a subset of recommendations comprises processing the plurality of recommendations stored in the recommendation log according to at least one of: a date range, a time range, type of item for which the recommendation was created, and a specific topic relating to the one or more of the plurality of recommendations.

31. The machine-readable medium of claim 27, wherein determining a subset of recommendations comprises determining an overall score for the one or more recommendations included in at least a part of the plurality of the stored recommendations, the overall score being used as a relevance score that predicts the user's level of interest in the one or more recommendations.

32. The machine-readable medium of claim 27, wherein generating a recommendation log for the user and determining a subset of recommendations are performed passively without user interaction.

33. The machine-readable medium of claim 27, wherein providing an indication to the user of the recommendation digest generated is performed periodically or upon receipt of a user action.

34. The machine-readable medium of claim 27, wherein providing an indication to the user of the recommendation digest generated is performed automatically using one or more of at least electronic email, electronic messaging and wireless messaging.

35. The machine-readable medium of claim 27, wherein the recommendation digest generated comprises one or more of at least a listing of the recommendations in the digest, a title for the recommendation generated, an information summary for an item for which one or more recommendations were made, a basis for generating the recommendation for a particular item, an aggregate number of recommendations generated for the particular item, date when the recommendation was added to the recommendation log, and information regarding related uniform resource locators visited.

36. The machine-readable medium of claim 27, the one or more recommendations being determined by a logging component in response to a user accessing content comprising one or more of at least web pages, email messages or documents, and wherein the determined recommendations are links to content of potential interest to the user.

37. The machine-readable medium of claim 27, the one or more recommendations being determined by a recommender component in response to a user accessing content comprising one or more of at least product descriptions, web pages, email messages, documents and images, and wherein the determined recommendations are identifiers of products of potential interest to the user.

38. The machine-readable medium of claim 27, the one or more recommendations being determined by a logging component in response to a user accessing content comprising one or more of at least product descriptions, web pages, email messages, documents and images, and wherein the determined recommendations are advertisements.

39. The machine-readable medium of claim 27, wherein one or more recommendations are hyperlinks embedded in content accessed by the user.

40. A method of providing recommendation digests to a user in an information system, the method comprising:
   generating a plurality of recommendations related to interaction of the user with the information system, wherein each of the plurality of recommendations is based on an informational context of a network resource containing information, the network resource being of a plurality of network resources accessed by the user;
   presenting the generated plurality of recommendations to the user;
   logging all of recommendations presented to the user, for all contexts, as recommendation-user pairs to generate a recommendation log corresponding to the user;
   aggregating the recommendations in the recommendation log, the aggregating including:
      computing predictor statistics based on a frequency of occurrence of each of the recommendations; and
      ranking the recommendations according to the predictor statistics to obtain ranked recommendations; and
   generating the recommendation digests by selecting subsets of the ranked recommendations and adding explanatory information to the subsets,
   wherein the frequency of occurrence of each of the recommendations is a number of times a recommendation is presented to the user; and
   wherein the subset of recommendations is further based on a computed number of distinct usage sessions during which the item was recommended to the user and wherein the computed number of distinct usage sessions are computed by the system.

41. The method of claim 40,
   wherein the information systems are selected from a group consisting of a corporate knowledge management system, a search engine, an eCommerce application, a browser, and an email client,
   wherein the recommendations are selected from a group consisting of recommended products, recommended advertisements, recommended links, recommended web pages, and recommended documents,
   wherein the recommendations have formats selected from a group consisting of a pointer and a link,
   wherein the contexts are selected from a group consisting of web pages viewed by the user, products viewed by the user, products purchased by the user, uniform resource locators visited by the user, and queries made by the user,
   wherein the recommendation log stores each of the recommendations together with a corresponding date of recommendation, context, user identification, and confidence in the recommendation, and
   wherein the predictor statistics further include one or more of a number of the contexts triggering the occurrence of each recommendation, and number of sessions including each recommendation.

* * * * *